United States Patent [19]
Quiring

[11] Patent Number: 5,398,946
[45] Date of Patent: Mar. 21, 1995

[54] CHUCK HAVING ONE-STEP LOCK AND RELEASE

[75] Inventor: Edward L. Quiring, Rogers, Minn.

[73] Assignee: Poly-Tech Industries, Minneapolis, Minn.

[21] Appl. No.: 175,141

[22] Filed: Dec. 29, 1993

[51] Int. Cl.6 .......................................... B23B 31/107
[52] U.S. Cl. ........................................ 279/30; 279/75; 279/145; 279/905; 408/239 A; 403/325
[58] Field of Search ...................... 279/22, 24, 28-30, 279/75, 82, 905, 906; 403/DIG. 6, 325

[56] References Cited

U.S. PATENT DOCUMENTS

| | | | |
|---|---|---|---|
| 751,345 | 2/1904 | Saunders | 279/28 |
| 4,692,073 | 9/1987 | Martindell | 408/239 A |
| 4,900,202 | 2/1990 | Wienhold | 408/240 |
| 5,013,194 | 5/1991 | Wienhold | 408/240 |

Primary Examiner—Steven C. Bishop
Attorney, Agent, or Firm—Palmatier, Sjoquist & Helget

[57] ABSTRACT

A chuck device having a one-step lock and release mechanism for conveniently coupling a power bit to a drill having a Jacobs-style chuck. The chuck device includes a body having a centrally-positioned bore which is adapted to receive the power bit shank. The power bit shank includes a circumferentially-extending groove which is positioned inside the bore. The body has an inclined cam channel which includes an aperture for communicating with the bore. The body further includes a longitudinally-extending slot communicating with the inclined cam channel. A detent ball is disposed within the inclined cam channel for partial penetration through the aperture for engaging the circumferentially-extending groove of the power bit shank. A spring having an end encircles the body where the end is slidably positioned within the slot for biasing the detent ball rearwardly along the inclined cam channel during the unlocking and withdraw of a power bit from the chuck device. The position of the spring is confined on the body by a retaining ring positioned proximate to the inclined cam channel and by a sleeve which encircles a portion of the body. The retraction of the sleeve in a rearward direction compresses the spring and rearwardly biases the spring end within the slot for movement of the detent ball from locking engagement to the circumferentially-extending groove. Release of the sleeve permits the expansion of the spring and the biasing of the sleeve and detent ball in a forward direction for locking engagement to a power bit.

11 Claims, 2 Drawing Sheets

CHUCK HAVING ONE-STEP LOCK AND RELEASE

BACKGROUND OF THE INVENTION

The invention relates to a chuck device having a one-step lock and release mechanism for coupling a tool bit to a Jacobs-style of chuck of a power tool.

The American National Standards Institute has a specification for tool bits known as ANSI 107.4-1982 which generally refers to the driving and spindle ends of portable powered and hand-held machines. The tool bits referred to in accordance with the standard generally include a hexagonally-shaped shank having a circumferentially-extending groove surrounding the shank. The circumferentially-extending groove generally includes a curved bottom portion disposed between two shoulder portions. These tool bits are generally used for drilling, or are used for driving fasteners such as screws, nuts and bolts, and other workpieces requiring rotation of motion.

It is highly desirable to provide a chuck device which permits the quick and efficient replacement of tool bits as used with a power source such as a drill. Numerous examples of quick-release tool chucks are known, an example of which include U.S. Pat. No. 5,013,194.

During operation of the known quick-release chuck devices, a detent ball is normally positioned against the circumferentially-extending groove of the shank for affixing the tool bit within the bore of the quick-release chuck. A sleeve is generally urged into contact with the ball by a compression spring which establishes a locking engagement between the ball and the groove. The sleeve is generally limited in movement to one direction upon the quick-release chuck. A problem with the quick-release chuck devices involves the clenching or locking of a detent ball against the shoulder portions of the circumferentially-extending groove, which inhibits the retraction of the sleeve and the insertion of a tool bit into the quick-release chuck.

SUMMARY OF THE INVENTION

A chuck device having a one-step lock and release mechanism for conveniently coupling a power bit to a motor shaft having a Jacobs-style chuck. The chuck device includes a body having a centrally-positioned bore which is adapted to receive the power bit shank. The power bit shank includes a circumferentially-extending groove which is positionable inside the bore. The body has an inclined cam channel which includes an aperture for communicating with the bore. The body further includes a longitudinally-extending slot communicating with the inclined cam channel. A detent ball is disposed within the inclined cam channel for partial penetration through the aperture for engaging the circumferentially-extending groove of the shank. A spring having a post encircles the body, where the post is slidably positioned within the slot for biasing the detent ball upwardly and rearwardly along the inclined cam channel during the unlocking and withdrawal of a power bit from the chuck device. The position of the spring is confined on the body by a retaining ring positioned proximate to the inclined cam channel and by a sleeve which encircles a portion of the body. The retraction of the sleeve in a rearward direction compresses the spring and rearwardly biases the rod within the slot for movement of the detent ball from locking engagement to the circumferentially-extending groove. Release of the sleeve permits the expansion of the spring and the biasing of the sleeve and detent ball in a forward direction for locking engagement to a power bit.

It is an object of the present invention to provide a chuck device having a one-step lock and release mechanism for coupling of a tool bit to a power source having a Jacobs-style chuck.

It is another object of the present invention to provide a chuck device which may receive and lock a tool bit to a Jacobs-style chuck without the manual manipulation of a sleeve.

It is still another object of the present invention to provide a chuck device which biases a detent ball for release of a tool bit from the chuck device.

It is still another object of the present invention to minimize the clenching and locking of a detent ball within a circumferentially-extending groove during separation and removal efforts of a tool bit from the chuck device.

It is still another object of the present invention to provide a chuck device having a one-step lock and release mechanism of relatively simple and inexpensive design, construction, and operation which is safe and which fulfills the intended purpose of coupling a tool bit to a drill without fear of injury to persons or damage to property.

A feature of the present invention includes a body having a centrally-positioned bore which is adapted to receive and lock a power bit having a circumferentially-extending groove to a power source having a Jacobs-style chuck.

Another feature of the present invention includes an inclined cam channel having an aperture which communicates with the bore.

Still another feature of the present invention includes a longitudinally-extending slot which communicates with the inclined cam channel.

Still another feature of the present invention includes a detent ball disposed within the inclined cam channel for partial penetration through the aperture which locks the tool bit to the bore of the chuck device.

Still another feature of the present invention includes a spring encircling the body where the spring has a post which is slidably positioned within the slot for biasing the detent ball upwardly and rearwardly along the inclined cam channel during the unlocking and withdrawal of a power bit from the chuck device.

Still another feature of the present invention includes a sleeve surrounding the body where retraction of the sleeve in a rearward direction compresses the spring and rearwardly biases the rod within the slot.

Still another feature of the present invention includes a retaining ring which positions the spring about the body between the retaining ring and the forward interior portion of the sleeve.

Still another feature of the present invention includes a sleeve having an integrally attached retaining member which biases the detent ball in a forward direction for locking engagement to a power bit upon the expansion of the spring and movement of the sleeve in a forward direction.

DETAILED SPECIFICATION OF THE PREFERRED EMBODIMENT

Figure 1:
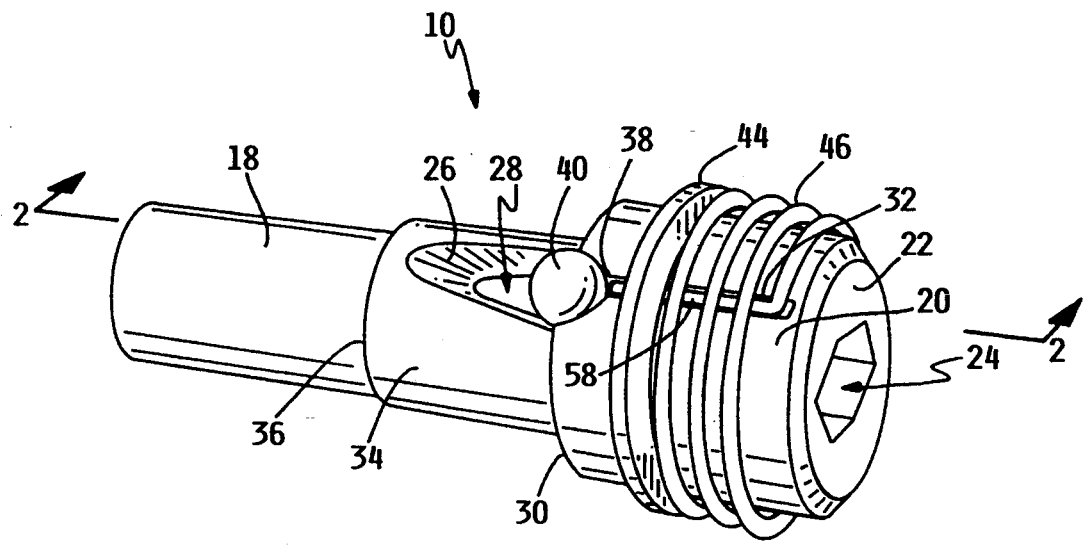
FIG. 1 is an isometric view of the invention.

One form of the invention is illustrated and described herein. The chuck device having a one-step lock and release mechanism is indicated in general by the numeral 10. The chuck device 10 is used in conjunction with a tool bit generally including a hexagonally-shaped shank 12 and a circumferentially-extending groove 14 about the shank 12. The circumferentially-extending groove 14 generally includes oppositely disposed shoulder portions 16. The tool bit may function as an adapter for fixedly engaging and conforming a round-shafted workpiece to the hexagonally-shaped shank 12. The shank 12 of the tool bit conforms to the size requirements of the ANSI standards and thereby has a dimension approximating one-quarter inch.

Tool bits are generally used with a power tool such as a drill having a three-jaw Jacobs-style chuck which is adapted to receive ANSI standardized workpieces. The tool bits as known are formed for rotative motion within either air or electric powered tools.

The chuck device 10 generally includes a body 18, a first shank section 20, a forward surface 22, a longitudinal bore 24, an inclined cam channel 26, an aperture 28, a first shoulder 30, a longitudinally-extending slot 32, a second shank section 34, and a second shoulder 36.

The shaft end of the body 18 is generally adapted for penetrating engagement into a standardized power tool having a three-jaw Jacobs-style chuck. The engagement between the body 18 and the Jacobs-style chuck prevents rotation therebetween during use of the chuck device 10. The body 18 preferably transfers rotational motion between a power tool and tool bit including a workpiece.

Figure 2A:
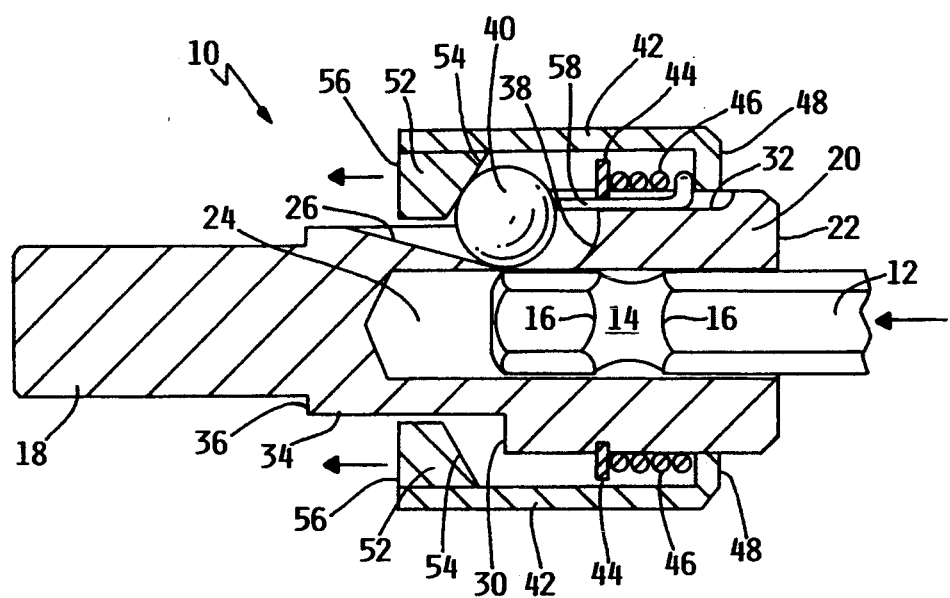
FIG. 2A is a cross-sectional side view of the invention taken along line 2—2 of FIG. 1 showing the insertion of a tool bit into the chuck device.

As seen in FIG. 2A, the body 18 includes a first shank section 20. The first shank section 20 has a forward surface 22, a first shoulder 30, and a longitudinally-extending slot 32. The first shank section 20 is preferably cylindrical in shape; however, any shape may be selected provided that the essential functions, features, and attributes described herein are not sacrificed.

The longitudinal bore 24 is centrally positioned through the forward surface 22 of the first shank section 20. The longitudinal bore 24 preferably extends through the body 18 to a central position within the second shank section 34. The longitudinal bore 24 is preferably hexagonal in shape and is adapted for receiving engagement of the shank 12 and circumferentially-extending groove 14 of a tool bit. The hexagonal shape of the shank 12 prevents rotation with respect to the longitudinal bore 24 during use of the chuck device 10.

The inclined cam channel 26 is preferably milled from a portion of the first and second shank sections 20, 34. The inclined cam channel 26 is preferably adapted for receiving engagement of a detent ball 40 which functions to engage the circumferentially-extending groove 14 for locking of the shank 12 to the chuck device 10. The inclined cam channel 26 is preferably concave and arcuate in shape and includes the aperture 28. The concave arcuate shape facilitates the retention of the detent ball 40 within the inclined cam channel 26.

The aperture 28 functions to provide communication between the body 18 and the longitudinal bore 24 during use of the chuck device 10.

The inclined cam channel 26 includes a first shoulder portion 38 which is preferably milled from the rearward edge of the first shank section 20.

The longitudinally-extending slot 32 preferably extends between the first shoulder portion 38 of the inclined cam channel 26 to a position rearward of the forward surface 22 of the first shank section 20. The longitudinally-extending slot 32 preferably communicates with the inclined cam channel 26. (FIGS. 1, 2A, 2B, 2C)

The first shoulder 30 limits the positioning of the sleeve 42 forwardly along the body 18 during use of the chuck device 10. The first shoulder 30 functions as a stop which is aligned to the detent ball 40 when the detent ball 40 is engaged to the aperture 28 and to the first shoulder portion 38. The first shoulder 30 functions to prevent the forward separation of the sleeve 42 from the chuck device 10 during use.

The second shank section 34 is preferably positioned rearward of the first shank section 20 proximal to the shaft of the body 18. The second shank section 34 provides an area for sliding engagement of the sleeve 42 rearwardly along the body 18 during use of the chuck device 10.

The detent ball 40 is preferably disposed within the inclined cam channel 26. The detent ball 40 may be freely positioned along the inclined cam channel 26 by manipulation of the sleeve 42. The detent ball 40 functions to releasably couple a tool bit to the chuck device 10. The detent ball 40 is preferably sized to be seated within the aperture 28 for engagement to the oppositely disposed shoulder portions 16, of the circumferentially-extending groove 14, during locking engagement of the tool bit to the chuck device 10. Separation of a tool bit from the chuck device 10 is thereby prevented by the fixed positioning of the detent ball 40 within the circumferentially-extending groove 14. Inadvertent separation of a tool bit and/or workpiece from a power tool is thereby eliminated during use of the chuck device 10.

A retaining ring 44 preferably encircles the first shank section 20 and the slot 32. The retaining ring 44 is preferably positioned between the first shoulder portion 38 and the forward surface 22. The retaining ring 44 preferably functions to confine the position of the spring 46 about the first shank section 20 during use of the chuck device 10. The retaining ring 44 is preferably positioned perpendicularly from the first shank section 20.

Figure 2B:
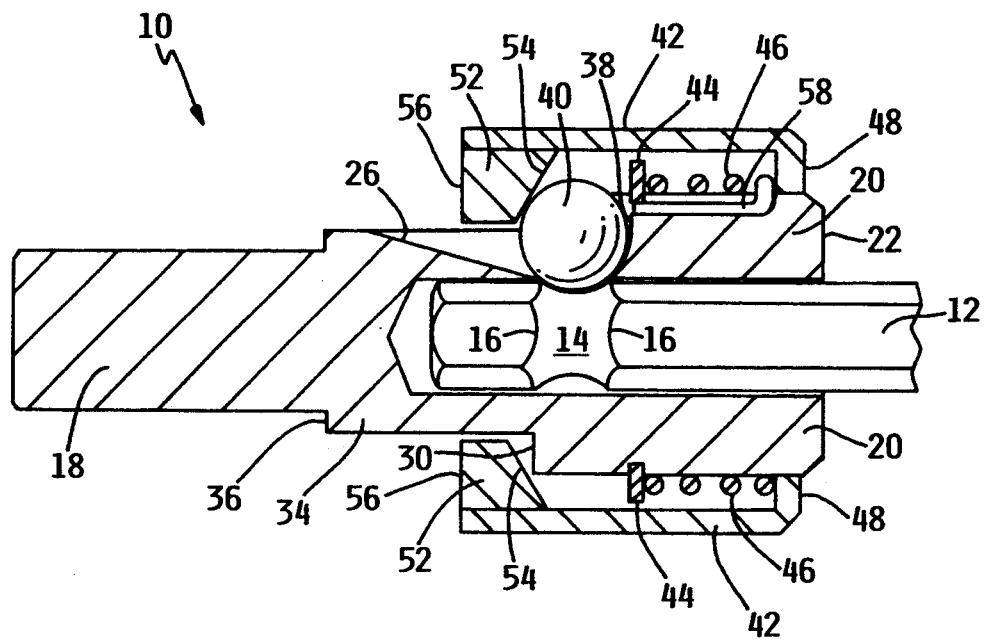
FIG. 2B is a cross-sectional side view of the invention taken along line 2—2 of FIG. 1 showing the locking engagement of a tool bit to the chuck device.
Figure 2C:
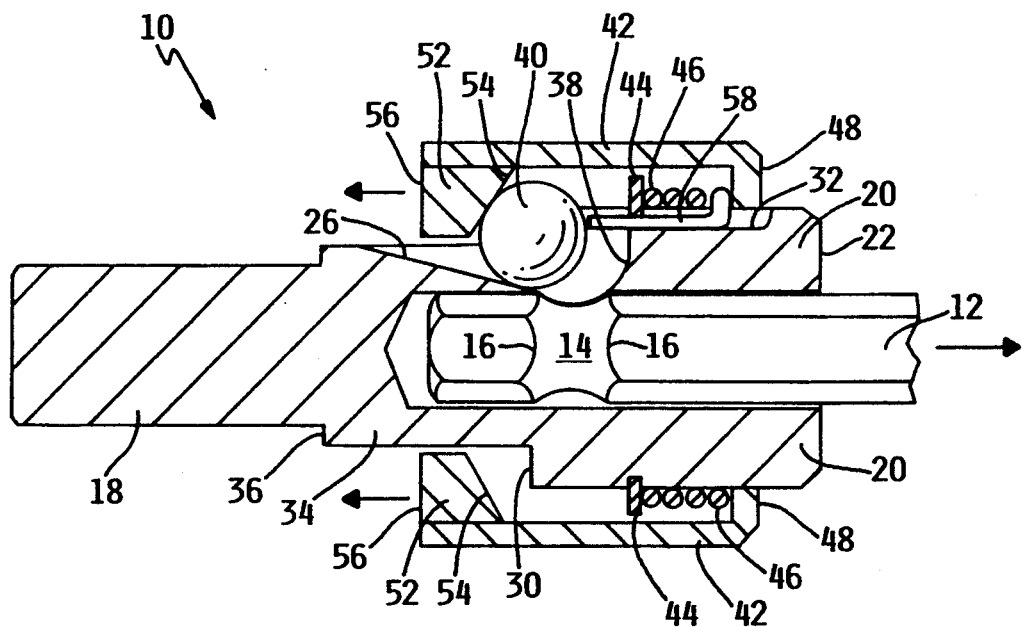
FIG. 2C is a cross-sectional side view of the invention taken along line 2—2 of FIG. 1 showing the disengagement of a tool bit from the chuck device.

The sleeve 42 is preferably cylindrical in shape encircling a portion of the first shank section 20, a portion of the inclined cam channel 26, the detent ball 40, the retaining ring 44, a portion of the second shank section 34, the first shoulder 30, and the spring 46. The sleeve 42 includes a forward face 48, an interior, and a retaining member 52. The forward face 48 is preferably positioned proximate to the forward surface 22 of the body 18. The interior of the forward face 48 preferably functions to engage and confine the position of the spring 46 within the interior of the sleeve 42. The spring 46 is preferably engaged to both the retaining ring 44 and the interior of the forward face 48 during use of the chuck device 10. The sleeve 42 is adapted for rearward retraction as shown in FIGS. 2A and 2C during the engagement or release of the shank 12 from the chuck device 10.

The sleeve 42 includes a retaining member 52 which is preferably positioned rearward of the detent ball 40. The retaining member 52 encircles the second shank section 34. The retaining member 52 includes a rear edge 56 which extends perpendicularly inward from the sleeve 42 toward the second shank section 34. The retaining member 52 also includes an inclined ridge 54 which extends forwardly from a position proximate to the second shank section 20 and the rear edge 56 toward the sleeve 42. The inclined ridge 54 is preferably adapted for engagement to the detent ball 40 facilitating the forward and downward positioning thereof into the aperture 28 during locking engagement to a tool bit. The inclined ridge 54 engages the detent ball 40 during the forward biasing of the sleeve 42 by the spring means 46 following insertion of a tool bit into the chuck device 10.

The sleeve 42 preferably flushly encircles the first shank section 20 of the body 18. The sleeve 42 may be rearwardly positioned along the first shank section 20 during the insertion or retraction of a tool bit into or form the chuck device 10.

The spring 46 preferably encircles the first shank section 20 between the retaining ring 44 and the interior of the forward face 48. The spring 46 preferably includes an end 58 which is positioned within the longitudinally-extending slot 32. The end 58 preferably extends below the retaining ring 44 for engagement to the detent ball 40. The spring 46 is preferably a compression spring which functions to permit the rearward retraction of the sleeve 42 facilitating the disengagement of the detent ball 40 from the aperture 28 during the insertion or release of a tool bit from the chuck device 10. The end 58 preferably functions to bias the detent ball upwardly and rearwardly along the inclined cam channel 26 during the rearward retraction of the sleeve 42 and compression of the spring 46. The spring 46 additionally functions to bias the sleeve 42 in a forward direction for positioning of the detent ball 40 proximate to the first shoulder portion 38 for penetration through the aperture 28. The expansion of the spring 46 preferably forwardly retracts the end 58 within the slot 32, permitting the inclined ridge 54 to engage and forwardly bias the detent ball 40 toward the first shoulder portion 38.

During use of the chuck device 10, the spring 46 forwardly positions the sleeve 42 about the first shank section 20 for approximate alignment of the inclined ridge 54 to the first ledge 30. The detent ball 40 is then positioned for flush engagement to the first shoulder portion 38 of the inclined cam channel 26. The expansion of the spring 46 forwardly positions the end 58 within the longitudinally-extending slot 32 for separation from the detent ball 40. The body 18 of the chuck device 10 may be fixedly attached to the Jacobs-style chuck of a power tool.

A tool bit may then be attached to the chuck device 10 by insertion of the shank 12 having the circumferentially-extending groove 14 within the longitudinal bore 24 as illustrated in FIG. 2A. The engagement of the shaft 12 to the detent ball 40 causes the rearward and upward biasing of the detent ball along channel 26 to the inclined ridge 54 of the retaining member 52. The continued insertion of the shank 12 within the bore 24 causes the contraction of the spring 46 which rearwardly slides the end 58 within the longitudinally-extending slot 32. The sleeve 42 is rearwardly biased along the first shank section 20 facilitating the continued insertion of the shank 12 within the bore 24.

The alignment between the aperture 28 and the circumferentially-extending groove 14 causes the ball 40 to drop into the groove 14, and permits expansion of the spring 46 against the interior of the forward face 48 which forwardly biases the sleeve 42 toward the forward surface 22 of the first shank section 20. The forward biasing of the sleeve 42 maintains the engagement between the inclined ridge 54 and the detent ball 40, for downward and forward positioning thereof within the inclined cam channel 26. The inclined ridge 54 holds the detent ball 40 in penetration through the aperture 28 for locking engagement to the circumferentially-extending groove 14 of the shank 12. The locking of the tool bit to the chuck device 10 then occurs as illustrated in FIG. 2B.

The withdrawal of a tool bit from the chuck device 10 may occur by the rearward manipulation of the sleeve 42 as illustrated in FIG. 2C. The rearward manipulation of the sleeve 42 contracts the spring 46 and slidably biases the end 58 within the longitudinally-extending slot 32 for the rearward and upward positioning of the detent ball 40 within the inclined cam channel 26. The engagement between the end 58 and the detent ball 40 assists in the separation of the detent ball 40 from the circumferentially-extending groove 14 and the aperture 28, for unlocking the shank 12 from the longitudinal bore 24. The separation of the detent ball 40 from the circumferentially-extending groove 14 permits the withdrawal of the tool bit shank 12 from the chuck device 10. As an alternative to the spring end 58 engagement against the detent ball 40, it would also be possible to utilize a washer having a right angle protrusion fitted into the slot 32 for engagement against the detent ball 40. In this case, the washer would be positioned between the spring 46 and the interior of the forward face 48.

During use of the chuck device 10 an individual is not required to manipulate the sleeve 42 during insertion of a tool bit within the bore 24. The insertion of a shank 12 within the bore 24 automatically retracts the sleeve 42 and compresses the spring 46. The subsequent expansion of the spring 46 repositions the detent ball 40 through the aperture 28 and into the circumferentially-extending groove 14, thereby locking the tool bit to the chuck device 10. The rearward retraction of the sleeve 42 permits the withdrawal of a tool bit from a power tool, satisfying the ANSI standards.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A chuck device for a tool bit having a shank and a circumferentially-extending groove about said shank, said chuck device comprising:
   (a) a body having a forward surface, a bore through said forward surface for receiving said shank, said body further having an inclined cam channel having an aperture communicating with said bore, said body further having a slot aligned to and communicating with said inclined cam channel;
   (b) a detent ball disposed in said inclined cam channel, a portion of said detent ball extendable through said aperture into said bore for engagement to said circumferentially-extending groove about said shank;

(c) a sleeve encircling a portion of said body, a portion of said inclined cam channel, and said detent ball, said sleeve having a forward face and a retaining member encircling said body, said retaining member engaging said detent ball for forward and downward positioning of said detent ball within said inclined cam channel for engagement of said detent ball to said circumferentially-extending groove of said shank during forward biasing of said sleeve for locking of said shank and said tool bit within said longitudinal bore;

(d) a spring means for biasing said sleeve, said spring means encircling said body between said inclined cam channel and said forward face, and means having an end positioned and extending longitudinally rearward within said slot toward said detent ball, said end being slidably positionable within said slot for engagement and biasing of said detent ball upwardly and rearwardly along said inclined cam channel and for disengaging said detent ball from said circumferentially-extending groove of said shank during rearward retraction of said sleeve along said body for unlocking and removal of said tool shank from said chuck device; and (e) a retaining means for encircling said body and said slot, said retaining means positioned between said inclined cam channel and said forward surface for retaining said spring means between said retaining means and said forward face.

2. A chuck device for a tool bit having a shank and a circumferentially-extending groove about said shank, said chuck device comprising:

(a) a body having a first shank section having a forward surface, a longitudinal bore centrally positioned through said forward surface, said body further having an inclined cam channel having an aperture communicating with said longitudinal bore, said first shank section further having a first shoulder and a longitudinally-extending slot aligned to and communicating with said inclined cam channel;

(b) a detent ball disposed in said inclined cam channel, a portion of said detent ball extendable through said aperture into said longitudinal bore for engagement to said circumferentially-extending groove about said tool bit shank;

(c) a ring affixed to and encircling said first shank section and said slot, said ring positioned between said inclined cam channel and said forward surface;

(d) a sleeve having an interior encircling said first shank section, a portion of said inclined cam channel, said detent ball, said ring, and a portion of said body, said sleeve having a forward face and a rear retaining member encircling said body and partially covering said inclined cam surface, said rear retaining member engaging said detent ball for forward and downward positioning of said detent ball within said inclined cam channel for engagement of said detent ball to said aperture and to said circumferentially-extending groove of said shank during forward positioning of said sleeve for locking of said shank and said tool bit within said longitudinal bore; and (e) a spring means for biasing said sleeve, said spring means encircling said first shank section between said ring and said forward face, said spring means having an end positioned and extending longitudinally rearwardly within said slot toward said detent ball, said end being slidably positioned within said slot for engagement and biasing of said detent ball rearwardly along said inclined cam channel and for disengaging said detent ball from said circumferentially-extending groove of said tool bit shank during rearward retraction of said sleeve along said body for unlocking and removal of said tool bit shank from said chuck device, whereby the rearward retraction of said sleeve contracts said spring means and the expansion of said spring means forwardly positions said sleeve for engagement of said rear retaining member to said detent ball for forward and downward positioning of said detent ball within said inclined cam channel for locking of said tool bit shank and said tool bit within said longitudinal bore.

3. The chuck device according to claim 2, said body further comprising a second shank section, a shaft, and a second shoulder rearward of said first shank section.

4. The chuck device according to claim 3, wherein said bore further comprises a closed end centrally positioned within said second shank section.

5. The chuck device according to claim 4, wherein said bore is hexagonal in shape.

6. The chuck device according to claim 4, wherein said inclined cam channel has an arcuate concave shape and comprises a shoulder traversing a portion of said first shank section.

7. The chuck device according to claim 6, wherein said longitudinal slot traverses and extends from said cam channel shoulder to a position proximate to said forward surface of said first shank section.

8. The chuck device according to claim 7, wherein said retaining ring extends perpendicularly from said first shank section.

9. The chuck device according to claim 8, wherein said retaining ring is positioned proximate to said cam channel shoulder.

10. The chuck device according to claim 9, wherein said retaining member further comprises a rear edge positioned rearwardly of said first shoulder and perpendicularly to said second shank section, and an inclined ridge extending forwardly from a position proximate to said second shank section, and proximate to said rear edge, toward said sleeve, said inclined ridge engaging said detent ball for forwardly and downwardly biasing said detent ball within said inclined cam channel for locking engagement to said circumferentially-extending groove.

11. The chuck device according to claim 10, where said body is cylindrical in shape.

* * * * *